(12) United States Patent
Knappmann et al.

(10) Patent No.: US 8,054,734 B2
(45) Date of Patent: Nov. 8, 2011

(54) OBJECTIVE LENS AND OPTICAL PICKUP COMPRISING THE OBJECTIVE LENS

(75) Inventors: Stephan Knappmann, Zimmern ob Rottweil (DE); Joachim Knittel, Tuttlingen (DE); Juergen Moessner, Brigachtal (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 12/806,867

(22) Filed: Aug. 23, 2010

(65) Prior Publication Data
US 2011/0044154 A1 Feb. 24, 2011

(30) Foreign Application Priority Data

Aug. 24, 2009 (EP) ..................................... 09305783

(51) Int. Cl.
*G11B 7/00* (2006.01)
(52) U.S. Cl. ......... 369/112.23; 369/112.24; 369/112.26; 369/44.23
(58) Field of Classification Search ......................... None
See application file for complete search history.

(56) References Cited

U.S. PATENT DOCUMENTS

| 7,236,443 | B2 * | 6/2007 | Martynov et al. | ........ 369/112.01 |
| 7,826,317 | B2 * | 11/2010 | Ishimoto | .................... 369/44.32 |
| 2008/0089208 | A1 | 4/2008 | Verschuren | |
| 2008/0106982 | A1 * | 5/2008 | Seo et al. | .................... 369/44.22 |
| 2008/0198728 | A1 | 8/2008 | Watanabe | |
| 2008/0304395 | A1 | 12/2008 | Lee | |

FOREIGN PATENT DOCUMENTS

| JP | 11259897 | 9/1999 |
| JP | 2008065931 | 3/2008 |
| JP | 2009093745 | 4/2009 |

OTHER PUBLICATIONS

International Search report dated Dec. 9, 2009.

* cited by examiner

*Primary Examiner* — Muhammad N Edun
(74) *Attorney, Agent, or Firm* — Robert D. Shedd; Harvey D. Fried; Richard LaPeruta

(57) ABSTRACT

Optical pickup 24 for operation in the far-field and in the near-field mode comprising a movable part 26 having an objective lens 2 comprising a solid immersion lens 4 and a multifocal lens 6, which are both disposed on a common optical axis A. The multifocal lens 6 comprises a central zone 8 and a peripheral zone 10 being circumferential to the central zone 8. The peripheral zone is adapted to constitute an optical system for a far-field mode. The central zone 8 of the multifocal lens 6 together with the solid immersion lens 4 are adapted to constitute an optical system for a near-field mode. The solid immersion lens and the multifocal lens are adapted to be moved in unison. A method for operating an optical pickup 24 comprises a first approach to a surface 21 of an optical storage medium 22 with the movable part 26 to reach a far-field working distance DF based on a focus control using an optical system for working in the far-field mode, and a subsequent approach to the surface 21 of the optical storage medium 22 which is performed by lowering the far-field working distance DF to a smaller near-field working distance NF.

15 Claims, 4 Drawing Sheets

OBJECTIVE LENS AND OPTICAL PICKUP COMPRISING THE OBJECTIVE LENS

This application claims the benefit, under 35 U.S.C. §119 of European Patent Application 09305783.4, filed Aug. 24, 2009.

FIELD OF THE INVENTION

The present invention relates to an objective lens for near-field data storage, to an optical pickup using the aforementioned objective lens, and further a method for operating such optical pickup.

BACKGROUND OF THE INVENTION

Nowadays information technology is confronted with an increasing amount of data, due to more complex or multimedia applications. Accordingly, removable data storage devices with a high storage capacity are needed, e.g. for high resolution movies or video games. Well at the beginning of information technology, magnetic storage devices were favored, while nowadays, optical storage media such as CD (Compact Disk), DVD (Digital Versatile Disk) or BD (Blu-Ray Disk) are dominating the market for removable data storage media.

Optical data storage is generally limited by the optical resolution of the read/write-system. Straightforward methods of increasing the optical resolution involve widening of the focused beam and opening angle, i.e. the numerical aperture NA, at the costs of lens complexity. Further approaches are narrowing the allowable tilt margins for the optical storage media or reducing the wavelength of the scanning laser into the blue or near-UV range. A different approach for reducing the focus spot size in an optical data storage system is using near-field optics with a high numerical aperture (NA>1). This high numerical aperture is generally achieved by help of a solid immersion lens (SIL). While conventional systems like CD, DVD or BD operate in the optical far-field regime, which is described by classical optics, the aforementioned new systems work in the optical near-field regime, which is described by near-field optics. For conventional systems the working distance, i.e. the air gap between the surface of the optical storage medium and the first optical surface of the read/write-head, usually the objective lens, is in the scale of 100 µm. In contrast, systems making use of near-field optics need a very small working distance or air gap, which is in the scale of 50 nm. An optical storage system for recording and/or reading making use of near-field optics is disclosed in WO 2005/104109 A1. The low working distance between the surface of the storage medium and the surface of the objective lens is one of the main challenges of near-field technology. The small working distance requires setting strict specifications on the tilt and vertical deviation limits for the related optical storage medium e.g. a disc. Even if the disc specifications only allow vertical run out values which are several times smaller than for a current Blu-Ray Discs, e.g. 20 µm instead of 100 µm, it is still difficult for the read/write-head of an optical pick up to approach the disc surface and close the focus loop without head-disc contact or head crash.

A straight forward approach is to start the read/write operation from a lead-in area where tilt and deviation are usually lower compared to outer areas of the storage medium. However, for a near-field optical storage system it is desirable to reach outer areas of the storage medium without continuous focus operation at the aforementioned low working distance of approx. 50 nm.

Also, JP 11-259897 discloses an optical pickup capable of recording and reproduction for both high-density and low-density optical recording media. The pickup has a first objective for low-density media, which converges collimated light, a light shield which cuts off part of the light passing through the first objective, and an optical element consisting of a second objective and a solid immersion lens for high-density media. For low-density media the head is put close to the light shield by a slider. For high-density media the head is put adjacent to the recording medium.

US 2008/0198728 discloses an optical disk drive comprising an objective lens, a solid immersion lens, and an aperture element for collecting a part of a light beam reflected by an optical recording medium, corresponding to the effective aperture number of the objective lens and the solid immersion lens of less than 1 A speed-generating circuit reduces a speed of approach of the solid immersion lens to the recording medium in accordance with the level of a signal detected by a detecting element. A driver circuit drives the objective lens and the solid immersion lens in accordance with the output from the speed-generating circuit. In this way it is assured that the solid immersion lens does not get into contact with the optical recording medium.

US 2008/0089208 discloses a near field optical scanning device, which is adapted to bring a lens from a remote position to a near field position relative to the surface of an optical recording medium. Image processing of aperture pupil images indicating the size of a gap between a solid immersion lens and the surface of the optical recording medium is used for this purpose. Image analysis of the aperture pupil image allows to derive a control signal for an approach procedure for air gap distances in a range of micrometers. This allows for a fast, efficient, accurate and reliable approach procedure.

SUMMARY OF THE INVENTION

It is an object of the present invention to provide an objective lens that allows a safe and fast approach to a surface of an optical storage medium. It is a further object of the present invention to propose an optical pickup comprising such an objective lens as well as a method for operating such an optical pickup, said method being improved with respect to the approach procedure.

The above objects are achieved by the subject matter of the independent claims. Advantageous embodiments of the invention are subject matter of the dependent claims.

According to the invention an objective lens is provided, which comprises a solid immersion lens and a multifocal lens, both being disposed on a common optical axis. The aforementioned multifocal lens comprises a central zone and a peripheral zone being circumferential to the central zone. The peripheral zone is adapted to constitute an optical system for a far-field mode. The central zone of the multifocal lens together with the solid immersion lens are adapted to constitute an optical system for a near-field mode. The solid immersion lens and the multifocal lens are adapted to be moved in unison. By combining the central zone of the multifocal lens and the solid immersion lens to an optical system it becomes possible to provide the objective lens with different optical properties in the central zone and the peripheral zone. This allows to adapt the optical properties of the two zones to different optical recording media.

Preferably, the central zone of the multifocal lens and the solid immersion lens constitute a near-field optical system. This near-field optical system advantageously has a numerical aperture higher than one. It is further advantageous to provide a multifocal lens having a peripheral zone that is designed in such a way that it allows operation in the optical far-field. Preferably, the focal length of the central zone is shorter than the focal length of the peripheral zone. As a solid immersion lens is generally needed for near-field optical data storage, this arrangement ensures that no additional modifications of the objective lens are necessary for reading from and/or writing to near-field storage media. At the same time, as the requirements for reading from and/or writing to far-field storage media are less tight, using only the peripheral zone is sufficient for such optical recording media.

The multifocal lens comprises two different zones offering a different focal length. Consequently, it is possible to use the multifocal lens for different purposes. A central zone of the multifocal lens together with a solid immersion lens is used for operation in near-field, while the peripheral zone of the multifocal lens is used for far-field operation. When approaching the objective lens to a surface of an optical storage medium, an advantageous two-step process is realized due to the fact that the objective lens is applicable to both, the far-field as well as the near-field.

It is further advantageous to provide the multifocal lens with an annular aperture that is disposed between the central and the peripheral zone of the multifocal lens. Said annular aperture allows omitting stray light.

Preferably, the focal length of the peripheral zone is adapted to a working distance between 50 and 250 μm in the far-field mode, whereas the focal length of the central zone of the multifocal lens is adapted to a working distance between 25 and 50 nm in the near-field mode. The working distance in the range of several tens or hundreds of μm allows a safe approach of a read/write-head comprising the aforementioned objective lens without a high risk for a head crash.

An optical pickup according to the invention is designed for operation in a far-field and in a near-field mode. Said optical pickup comprises an objective lens according to the invention.

Similar or comparable advantages mentioned for the objective lens apply to the optical pickup as well.

Preferably, a first portion of a signal beam is directed into a first analyzing beam path and a second portion of the signal beam is directed into a second analyzing beam path, wherein the first analyzing beam path is provided for focus control. In this case the optical pickup advantageously comprises a polarizing beam-splitter and a non polarizing beam-splitter, which are disposed in an optical path of the signal beam. The signal beam is coupled into the first analyzing beam path by the polarizing beam-splitter as well as into the second analyzing beam path by the non polarizing beam splitter. The first analyzing path preferably comprises an astigmatic lens.

The aforementioned optical pickup is advantageously operable in a far-field mode as well as in a near-field mode, while the astigmatic lens arranged in the first analyzing beam path advantageously allows an astigmatic focus control when operated in the far-field mode.

According to an advantageous alternative a first portion of the signal beam passing the solid immersion lens and the central zone of the multifocal lens is coupled into a first analyzing beam path and a second portion of the signal beam passing the peripheral zone of the multifocal lens is coupled into a second analyzing beam path, wherein the second analyzing beam path is provided for focus control. In this case the optical pickup advantageously comprises a polarizing beam-splitter and a non polarizing beam-splitter, which are disposed in an optical path of a signal beam, wherein a first portion of the signal beam, which has passed the solid immersion lens and the central zone of the multifocal lens, is coupled into a first analyzing beam path by help of the polarizing beam-splitter. The second portion of the signal beam, which has passed the peripheral zone of the multifocal lens, is coupled into a second analyzing beam path by the non polarizing beam-splitter. A quarter wave plate is disposed in the beam path of the first portion of the signal beam and an astigmatic lens is arranged in the second analyzing beam path. The quarter wave plate is preferably arranged on the surface of the multifocal lens or the surface of the solid immersion lens.

By help of the aforementioned optical pickup only a part of the signal beam passes the quarter wave plate. Accordingly, only that portion of the signal beam passing the aforementioned quarter wave plate shows a polarization perpendicular to the polarization of the beam used for read-out of data. Consequently, that part of the signal beam passing the quarter wave plate is coupled into the first analyzing beam path, whereas that part of the signal beam which does not pass the quarter wave plate is coupled into the second analyzing beam path. With the aforementioned optical pickup it is possible to provide a working distance control only by help of the second analyzing beam path. This applies to operation of the optical pickup in the far-field mode as well as in the near-field mode.

A method according to the invention is provided, which allows operation of an optical pickup in a far-field and in a near-field mode. Said optical pickup comprises an objective lens according to the invention. The method comprises the step of approaching a surface of an optical storage medium with the objective lens to reach a far-field working distance between said objective lens and the surface of the optical storage medium, wherein the far-field working distance equals at least approximately the focal length of the peripheral zone of the multifocal lens. The first approach is controlled by a focus control using an optical system for working in the far-field mode. In a further step of said method, the surface of the optical storage medium is approached by the objective lens to reach a near-field working distance that is shorter than the far-field working distance.

The aforementioned method for operating an optical pickup provides a two-step process for approaching the surface of an optical storage medium. Since the distance between the surface of the optical storage medium and the objective lens is relatively high in the first step, i.e. in the range of the focal length of the peripheral zone of the multifocal lens, the risk of a head crash is significantly lowered. This is due to the fact the far-field working distance is higher than a typical value of the vertical runout of e.g. a rotating disk.

Advantageously, the step of approaching the objective lens to the near-field working distance is done by reducing the far-field working distance by a predetermined value. During far-field operation parameters significant for the rotation of the storage medium, like tilt or vertical runout, are determined. Said parameters are valid for far-field operation as well as for near-field operation. The only difference is an off-set value in the working distances. This off-set is approximately given by a difference between the focal length of the peripheral zone of the multifocal lens and the near-field working distance.

It is further advantageous to provide a method for operating an optical pickup comprising the steps of:
coupling a first portion of a signal beam into a first analyzing beam path, the first analyzing beam path being provided for focus control; and
coupling a second portion of the signal beam into a second analyzing beam path;
wherein the step of approaching the surface of the optical storage medium to the far-field working distance is performed by a focus control using the first analyzing beam path.

For this purpose the pickup advantageously includes a polarizing beam-splitter and a non polarizing beam-splitter, which are disposed in an optical path of the signal beam. The signal beam is coupled into the first analyzing beam path comprising an astigmatic lens by help of the polarizing beam-splitter as well as into the second analyzing beam path by help of the non polarizing beam-splitter. The step of approaching the surface of the optical storage medium to the far-field working distance is done by an astigmatic focus control using the astigmatic lens arranged in the first analyzing beam path. An astigmatic focus control allows a fast and reliable control of the working distance.

It is further advantageous if during far-field operation the first analyzing beam path is used for controlling the working distance, while during near-field operation the second analyzing beam path is used for controlling the working distance, e.g. by help of a gap error signal. In the near-field mode, the first analyzing beam path is advantageously used for retrieving data.

Alternatively, a method for operating an optical pickup includes the steps of:
coupling a first portion of a signal beam passing the solid immersion lens and the central zone of the multifocal lens into a first analyzing beam path; and
coupling a second portion of the signal beam passing the peripheral zone of the multifocal lens into a second analyzing beam path, the second analyzing beam path being provided for focus control;
wherein the step of approaching the surface of the optical storage medium to the far-field working distance is performed by a focus control using the second analyzing beam path.

For this purpose the pickup preferably includes a polarizing beam-splitter and a non polarizing beam-splitter, which are disposed in an optical path of a signal beam. A first portion of the signal beam passing the solid immersion lens and the central zone of the multifocal lens is coupled into the first analyzing beam path by help of the polarizing beam-splitter. A second portion of the signal beam passing the peripheral zone of the multifocal lens is coupled into the second analyzing beam path comprising an astigmatic lens by the non polarizing beam-splitter. The step of approaching the surface of the optical storage medium to the far-field working distance is done by an astigmatic focus control using the astigmatic lens comprised by the second analyzing beam path. Advantageously, the second analyzing beam path is used for controlling the working distance during far-field operation and during near-field operation, while the second analyzing beam path is used for retrieving data only.

According to the aforementioned method a functional separation between working distance control and the retrieval of data is provided. This allows a simplification when implementing the control of the optical pickup.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
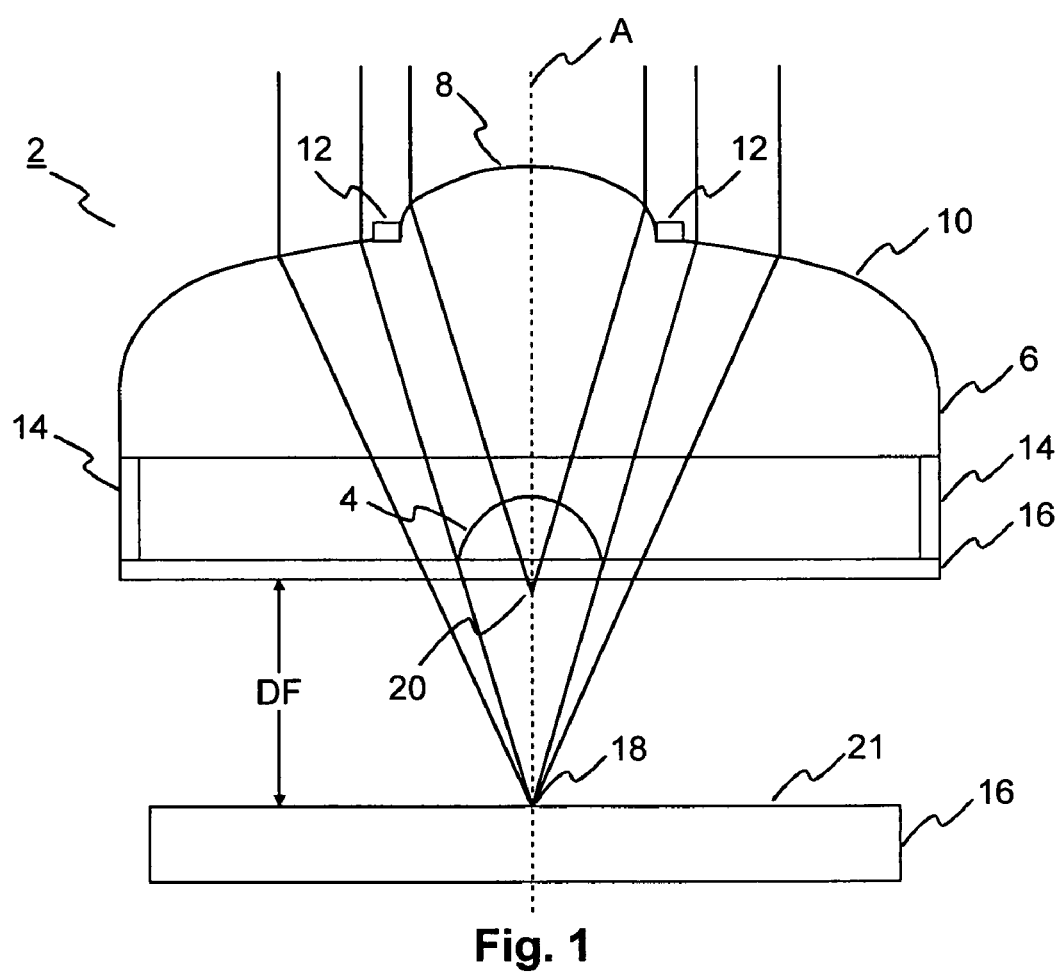
FIG. 1 shows an objective lens according to the invention in a longitudinal cut operating in far-field mode.
Figure 2:
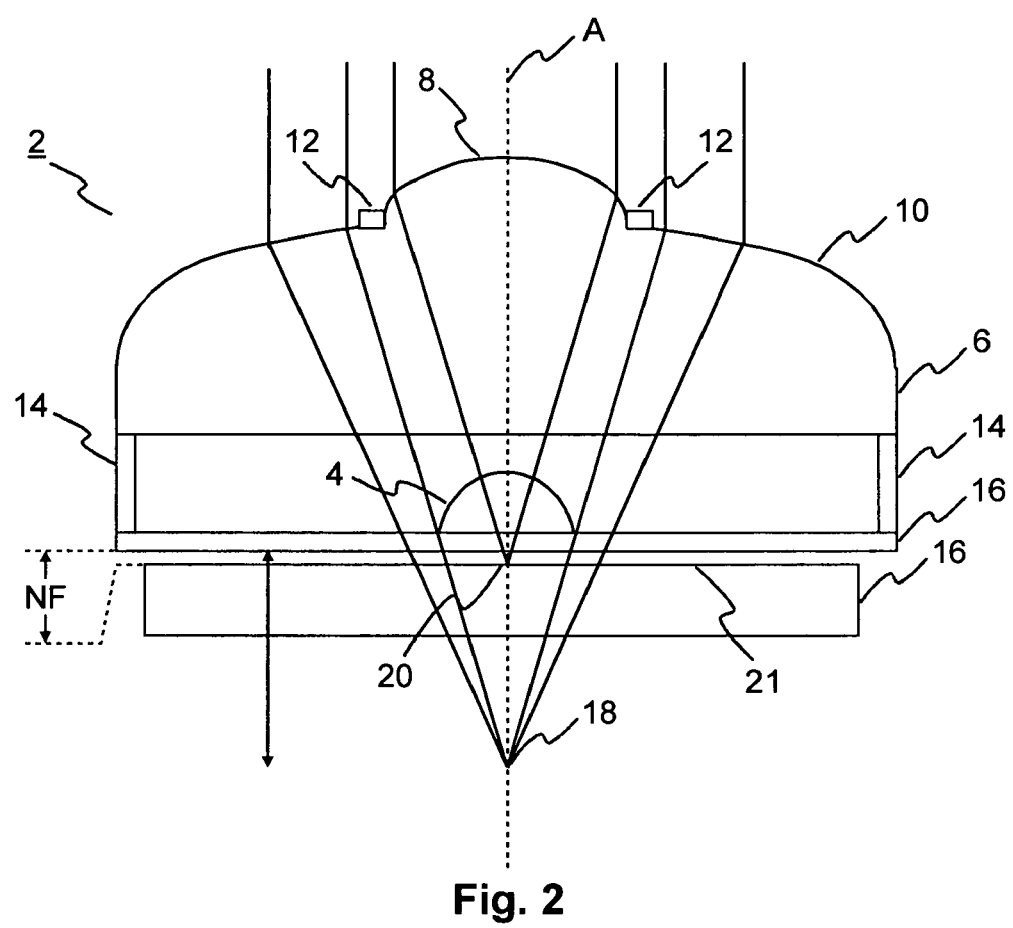
FIG. 2 shows the objective lens of FIG. 1 operating in near-field mode.

A longitudinal cut of a first embodiment of an objective lens 2 according to the invention is depicted in FIGS. 1 and 2. FIG. 1 shows the objective lens 2 working in a far-field mode, whereas FIG. 2 depicts the case of operation in a near-field mode. The objective lens 2 comprises a solid immersion lens 4 and a multifocal lens 6, both being disposed on a common optical axis A. the multifocal lens 6 comprises a central zone 8 and a peripheral zone 10, wherein the peripheral zone 10 is circumferential to the central zone 8. The objective lens 2 is capable of working in far-field mode as well as in near-field mode. To achieve this the peripheral zone 10 constitutes an optical system for working in the far-field mode. The central zone 8 together with the solid immersion lens 4 constitutes an optical system for working in the near-field mode. The latter has a high numerical aperture, i.e. NA>1. An annular aperture 12 is disposed between the central zone 8 and the peripheral zone 10 in order to prevent the occurrence of stray light.

The objective lens 2 further comprises an annular ring 14 acting as a distancing element between the multifocal lens 6 and a bottom 16. The solid immersion lens 4 is fixed on the aforementioned bottom 16, which is preferably made from the same material as the solid immersion lens 4. Of course, the solid immersion lens 4 may likewise be directly attached to the multifocal lens 6. Alternatively, the solid immersion lens 4 and the multifocal lens 6 are fully separate optical elements. The focal length of the central zone 8 and the focal length of the peripheral zone 10 of the multifocal lens 6 are chosen to be different. A far-field focus 18 defining a far-field working distance DF is defined by the focal length of the peripheral zone 10. The optical system constituted by the central zone 8 and the solid immersion lens 4 has a near-field focus 20 defining a near-field working distance NF. The far-field working distance DF as well as the near-field working distance NF is measured between the surface 21 of an optical storage medium 22 and the surface of the bottom 16 facing the aforementioned surface 21 of the optical storage medium 22. By way of an example only, the far-field working distance DF is in a range of 50 to 200 μm, while the near-field working distance NF is in the range of 25 to 50 nm. The far-field working distance DF equals at least approximately the focal length of the peripheral zone 10 of the multifocal lens 6. By way of an example only, the optical storage medium 22 is a disk rotating under a pickup comprising the objective lens 2.

The far-field working distance DF is set to a value typically larger than the vertical runout or tilt of the optical storage medium 22 in order to prevent a head crash or contact between the objective lens 2 and the surface 21 of the optical storage medium 22. In case of an optical disk the vertical runout of the optical storage medium 22 is periodical due to the rotational movement of that disk. Further, the vertical runout is the same for operation in far-field as well as for operation in near-field. Due to this fact the approach of the objective lens 2 to the surface 21 of the optical storage medium 22 is done in a two-step process, as will be explained in the following.

Figure 3:
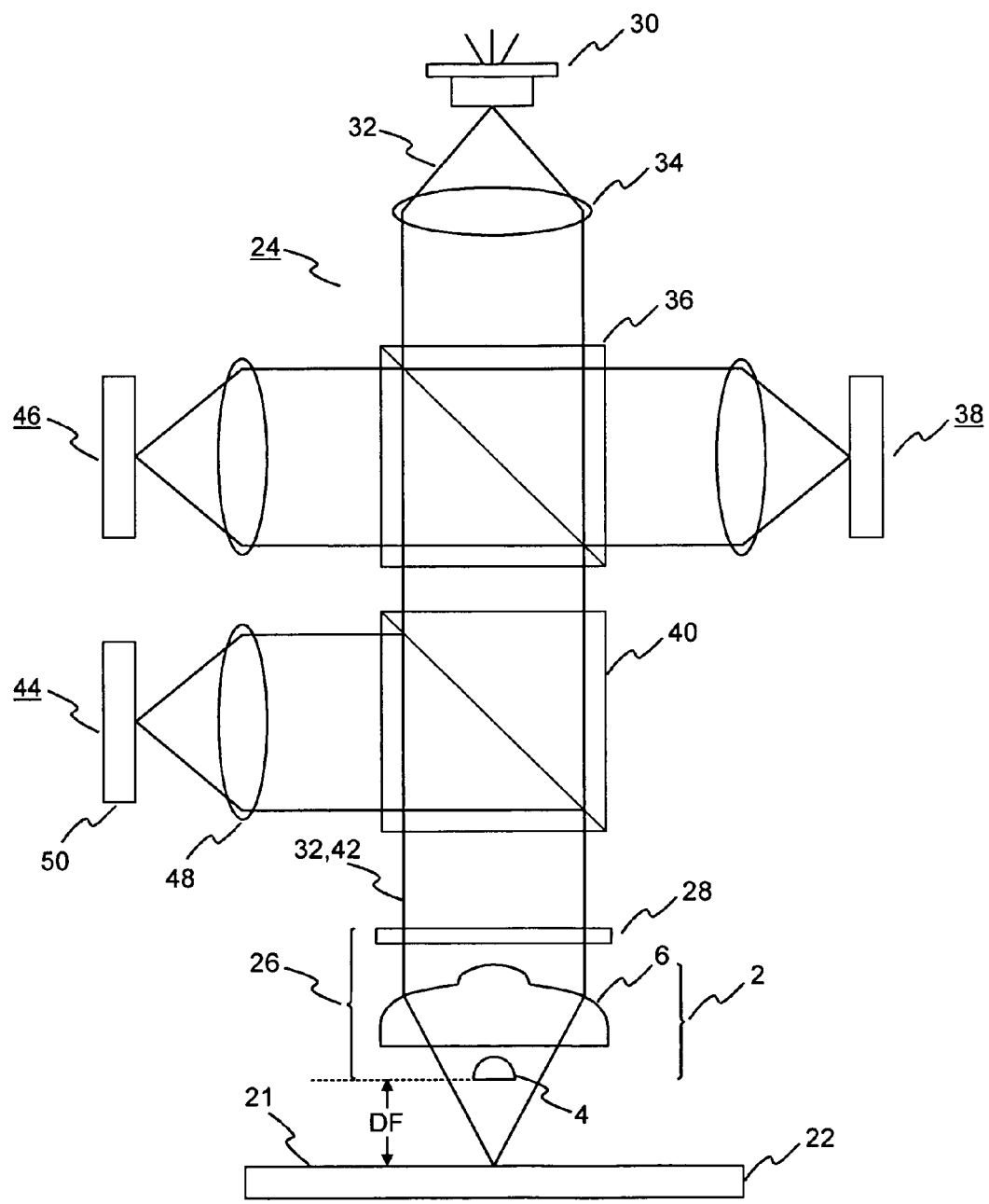
FIG. 3 shows a schematic sketch of a first embodiment of an optical pickup comprising the objective lens of FIGS. 1 and 2.
Figure 4:
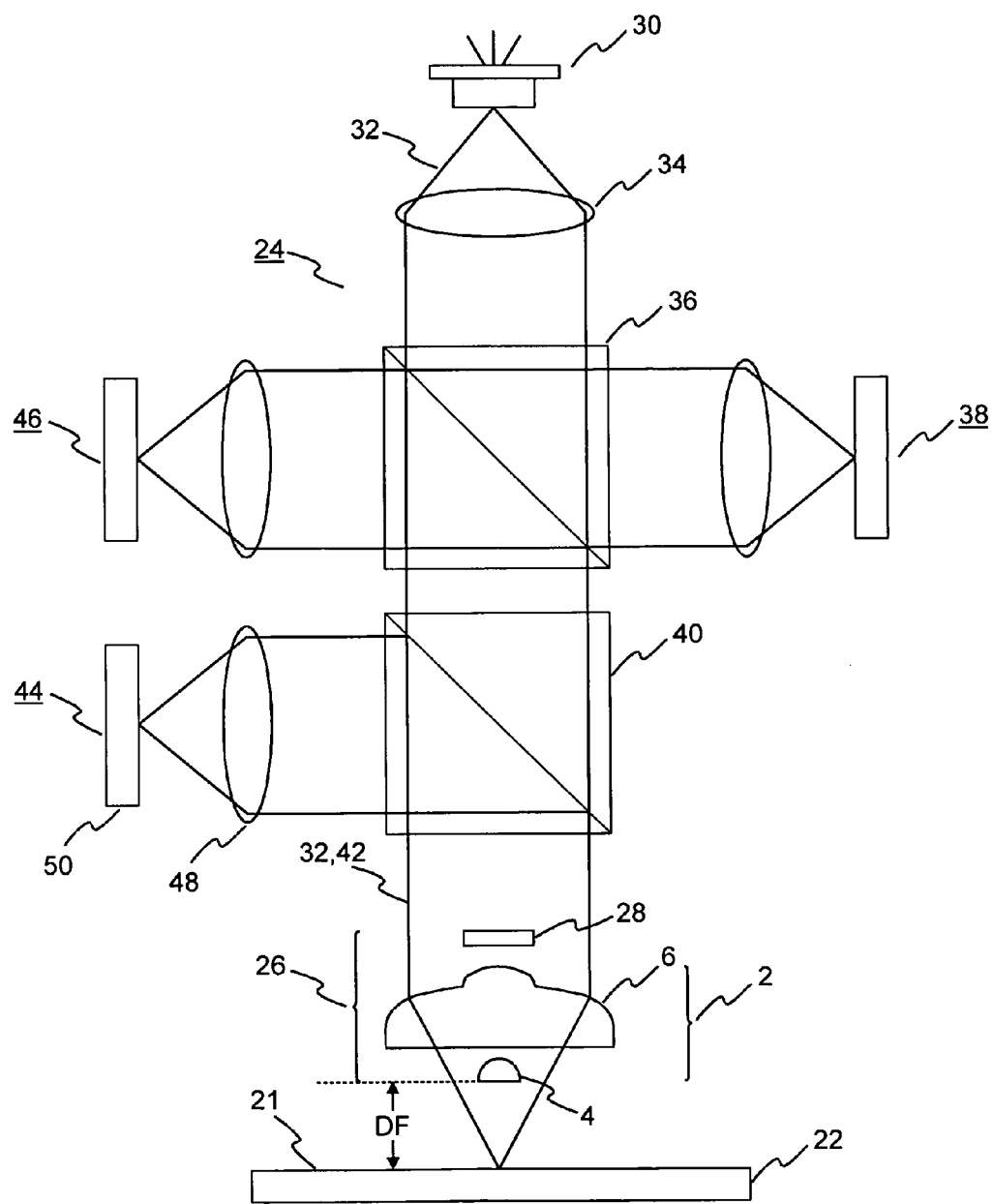
FIG. 4 shows a schematic sketch of a second embodiment of an comprising an optical pickup comprising the objective lens of FIGS. 1 and 2.

According to the invention a method for operating an optical pickup 24 including an objective lens 2 according to the invention is provided. Two exemplarily pickups 24 are shown in FIGS. 3 and 4, respectively. Said optical pickups 24 can be operated in a far-field mode and in a near-field mode. Further, they comprise a movable part 26 comprising a least an objective lens 2 according to the invention and a quarter wave plate 28. The movable part 26 is adjustable at least in a direction perpendicular to the surface 21 of the optical storage medium 22. Therefore, the working distance, i.e. the far-field working distance DF as well as the near-field working distance NF, is adjustable. By way of example only, the optical pickups 24 shown in FIGS. 3 and 4 are depicted in the far-field mode.

In a first step of said method the movable part 26 approaches the surface 21 of the optical storage medium 22 to reach the far-field working distance DF. Subsequently, according to a further step of said method, the surface 21 of the optical storage medium 22 is approached by the movable part 26 to reach a near-field working distance NF that is significantly smaller than the far-field working distance DF. When working in the far-field mode, the vertical runout of the optical storage medium 22 is determined. Parameters determined for the tracing of the surface 21 of the optical storage medium 26 are applicable both to far-field operation as well as to near-field operation. Accordingly, when approaching the surface 21 of the optical storage medium 22 to reach the near-field working distance NF, the movable part 26 is approached simply by reducing the far-field working distance DF by a predetermined value. Said value is known from the difference between the far-field working distance DF, which is approximately the focal length of the peripheral zone 10 of the multifocal lens 6, and the near-field working distance NF.

The optical pickup 24 shown in FIG. 3 comprises a laser diode 30 to generate a laser beam 32 that is collimated by a collimator 34. Said laser beam 32 passes a non polarizing beam-splitter 36 reflecting a part of said laser beam 32 to a power monitoring unit 38 used for feedback control of the laser-power. Subsequently, a polarizing beam-splitter 40 is passed before the laser beam 32 is focused to the optical storage medium 22 by help of the objective lens 2. The result from interaction between the laser beam 32 and a data layer of the optical storage medium 22 is a modulated signal beam 42.

The signal beam 42 travels along the same optical path as the laser beam 32 between the non polarizing beam-splitter 36 and the surface 21 of the optical storage medium 22. The signal beam 42 passes the movable part 26 and is coupled into a first analyzing beam path 44 by help of the polarizing beam-splitter 40 and into a second analyzing beam path 46 by help of the non polarizing beam-splitter 36.

The laser beam 32 traveling through the polarizing beam-splitter 40 has a linear polarization oriented in a first direction. The linear polarization of the laser beam 32 is converted into a circular polarization by help of the quarter wave plate 28. The direction of rotation of said circular polarized laser beam 32 is changed due to reflection of said laser beam 32 on the surface 21 of the optical storage medium 22. The reflected laser beam 32 is named the signal beam 42 and has a circular polarization in the opposite sense of direction compared to the laser beam 32. By help of the quarter wave plate 28 a signal beam 42 is achieved having a linear polarization oriented perpendicular to the respective orientation of the linear polarized laser beam 32 passing the polarizing beam-splitter 40 in the opposite direction. Accordingly, that part of the signal beam 42 is reflected into the first analyzing beam path 44. Said first analyzing beam path 44 comprises an astigmatic lens 48 allowing an astigmatic focus control by help of a four-quadrant detector 50.

A part of the laser beam 32 is further reflected on the bottom side of the solid immersion lens 4 facing the surface 21 of the optical storage medium 22. Depolarizing effects take place when the laser beam 32 is reflected on the aforementioned surface. Accordingly, the polarization direction of this reflected light does not exactly match the direction of the polarizing beam-splitter 40. Consequently, it passes said polarizing beam-splitter 40. The amount of depolarizing effects taking place on the bottom surface of the solid immersion lens 4 decreases with increasing amount of light coupled from the solid immersion lens 4 through the air gap to the surface of the optical storage medium 22 due to near-field effects. Accordingly, it is possible to provide a gap error control based on the signal correlated to the amount of reflected light. Said light is coupled into the second analyzing beam path 46 by help of the non polarizing beam-splitter 36.

In summary, the optical pickup 24 shown in FIG. 3 allows operation in far-field as well as in near-field mode. While in the near-field mode the gap error control done by the analyzing beam path 46 is used for controlling the near-field working distance NF, in far-field mode an astigmatic focus control done by the first analyzing beam path 44 secures the far-field working distance DF. Data retrieval performed if the optical set-up 24 is operated in the near-field mode is done by the first analyzing beam path 44.

A further embodiment of an optical pickup 24 is shown in FIG. 4. In comparison to the optical pickup 24 shown in FIG. 3 the quarter wave plate 28 is reduced in size. It covers the central part 8 of the multifocal lens 6, while in the peripheral zone 10 of the multifocal lens 6 the laser beam 32 as well as the signal beam 42 bypasses the quarter wave plate 28. Consequently, the linear polarization of the first portion of the laser beam 32 passing the peripheral zone 10 of the multifocal lens 6 is retained. Therefore, no change in the direction of the polarization takes place upon reflection at the surface 21 of the optical storage medium 21. Consequently, that part of the laser beam 32 passes the polarizing beam-splitter 40 and is reflected by the non polarizing beam-splitter 36 into the second analyzing beam path 46. Therefore, if the optical pickup 24 shown in FIG. 4 is operated in far-field mode, the far-field working distance DF is secured by an astigmatic focus control using an astigmatic lens 48 that is arranged in the second analyzing beam path 46.

When operated in near-field mode, the second part of the laser beam 32 passing the central zone 8 of the multifocal lens 6 changes its direction of polarization due to the fact it passes the quarter wave plate 28. Accordingly, it is reflected by the polarizing beam-splitter 40 into the first analyzing beam path 44. The optical pickup 24 shown in FIG. 4 allows to control the far-field working distance DF as well as the near-field working distance NF solely by help of the second analyzing beam path 46. Consequently, a functional separation between data retrieval in the first analyzing beam path 44 and distance control in the second analyzing beam path 46 is provided.

What is claimed is:

1. Objective lens, comprising a solid immersion lens and a multifocal lens, which are disposed on a common optical axis, wherein the multifocal lens comprises a central zone and a peripheral zone being circumferential to the central zone, wherein the peripheral zone is adapted to constitute an optical system for a far-field mode, and wherein the central zone of the multifocal lens together with the solid immersion lens are adapted to constitute an optical system for a near-field mode, the solid immersion lens and the multifocal lens being adapted to be moved in unison.

2. Objective lens according to claim 1, wherein the central zone of the multifocal lens and the solid immersion lens constitute a near-field optical system.

3. Objective lens according to claim 1, wherein the peripheral zone of the multifocal lens is designed in such a way that allows operation in an optical far-field.

4. Objective lens according to claim 1, wherein a focal length of the central zone is shorter than the focal length of the peripheral zone.

5. Objective lens according to claim 1, wherein an annular aperture is disposed between the central zone and the peripheral zone of the multifocal lens.

6. Optical pickup for operation in a far-field mode and in a near-field mode, wherein the optical pickup comprises an objective lens according to claim 1.

7. Optical pickup according to claim 6, wherein a first portion of a signal beam is directed into a first analyzing beam path and a second portion of the signal beam is directed into a second analyzing beam path, wherein the first analyzing beam path is provided for focus control.

8. Optical pickup according to claim 6, wherein a first portion of a signal beam passing the solid immersion lens and the central zone of the multifocal lens is coupled into a first analyzing beam path and a second portion of the signal beam passing the peripheral zone of the multifocal lens is coupled into a second analyzing beam path, wherein the second analyzing beam path is provided for focus control.

9. Method for operating an optical pickup, said optical pickup comprising an objective lens according to claim 1, the method comprising the following steps:
   approaching a surface of an optical storage medium with the objective lens with a focus control using an optical system for working in the far-field mode to reach a far-field working distance between said objective lens and the surface of the optical storage medium, wherein the far-field working distance equals at least approximately a focal length of the peripheral zone of the multifocal lens; and
   further approaching the surface of the optical storage medium with the objective lens to reach a near-field working distance that is shorter than the far-field working distance.

10. Method according to claim 9, wherein the step of approaching the objective lens to the near-field working distance is performed by moving the objective lens from the far-field working distance by a predetermined value.

11. Method according to claim 10, wherein the predetermined value equals at least approximately a difference between a focal length of the peripheral zone of the multifocal lens and the near-field working distance.

12. Method according to claim 9, further comprising the steps of:
   coupling a first portion of a signal beam into a first analyzing beam path, the first analyzing beam path being provided for focus control; and
   coupling a second portion of the signal beam into a second analyzing beam path;
wherein the step of approaching the surface of the optical storage medium to the far-field working distance is performed by a focus control using the first analyzing beam path.

13. Method according to claim 12, wherein during far-field operation the first analyzing beam path is used for controlling the far-field working distance, whereas during near-field operation the second analyzing beam path is used for controlling the near-field working distance while the first analyzing beam path is used for retrieving data.

14. Method according to claim 9, further comprising the steps of:
   coupling a first portion of a signal beam passing the solid immersion lens and the central zone of the multifocal lens into a first analyzing beam path; and
   coupling a second portion of the signal beam passing the peripheral zone of the multifocal lens into a second analyzing beam path, the second analyzing beam path being provided for focus control;
wherein the step of approaching the surface of the optical storage medium to the far-field working distance is performed by a focus control using the second analyzing beam path.

15. Method according to claim 14, wherein the second analyzing beam path is used for controlling the working distance during far-field operation and during near-field operation, while the first analyzing beam path is used for retrieving data.

* * * * *